United States Patent Office 3,041,276
Patented June 26, 1962

3,041,276
METHOD AND COMPOSITION FOR USE IN WELLS
Patrick H. Monaghan, Bellaire, Tex., assignor, by mesne assignments, to Jersey Production Research Company, Tulsa, Okla., a corporation of Delaware
No Drawing. Filed Sept. 8, 1959, Ser. No. 838,436
6 Claims. (Cl. 252—8.5)

The present invention is directed to a composition and method for use in wells. More particularly, the invention is concerned with a method of controlling wells and a composition which has a high density for use in controlling wells. In its more specific aspects, the invention is concerned with a composition having a high density which does not settle.

The present invention may be briefly described as a method for controlling a well which comprises forming a clay-free aqueous suspension containing from about 3 to about 8 parts of a smelter by-product per part of water and having a weight in the range from about 19 to about 32 pounds per gallon, the smelter by-product comprising iron and arsenic in a ratio of about 1.5:1; the suspension is circulated in a well to displace a lighter drilling fluid in the well and to provide a fluid of sufficient density to provide a hydrostatic pressure greater than formation pressure. The lighter drilling fluid may have a weight from about 8 to about 18 pounds per gallon.

The invention also comprises a composition for use in wells comprising an aqueous suspension containing from about 3 to about 8 parts of a smelter by-product per part of water and having a weight in the range from about 19 to about 32 pounds per gallon, the smelter by-product comprising iron and arsenic in a ratio of about 1.5:1, the suspension forming a firm gel structure.

The invention also is contemplated to include a method for forming a nonsettling suspension in which from about 3 to about 8 parts of a smelter by-product comprising iron and arsenic in a ratio from about 1.5:1 is admixed with one part of clay-free water whereby a firm gel structure is obtained in the suspension.

It is the purpose and intent of this invention to provide a method for control of unusual well conditions where only restricted column lengths are attainable and extreme density is required. Such conditions arise frequently in drilling wells where high pressures are encountered.

For example, such a condition often arises while drilling and high pressure is encountered causing the well to try to blowout and stick the drill pipe. It is then necessary to back-off the pipe and establish circulation at some point in the well bore which may be removed a substantial distance from bottom. It is then desirable to circulate an extreme density mud to provide the necessary hydrostatic force to overcome the high pressure formation.

Another circumstance that might cause the need for an extreme density fluid arises when the pipe is being removed from the well. If for any reason swabbing occurs as the pipe is withdrawn, the well will try to blowout with the end of the pipe some distance from the bottom. Once again a very heavy mud will be required to give a hydrostatic pressure above the formation pressure such as provided by the present invention.

In both these cases, it is possible to determine the density of the fluid needed. A condition may arise while there still is 2000 feet of pipe remaining in the hole and a 16.5 lb. per gal. mud is being used (density=2). If the hole remained full of mud, then the blowout preventors could be closed and the pressure on a gauge read. In this case, should the gauge read 1400 p.s.i., and it is desired to have 350 p.s.i. excess hydrostatic head for safety, making a total of 1750 p.s.i. in addition to the hydrostatic head already present, the gradient required would be 1750/2000=0.87 p.s.i./ft. and since water (density=1) exerts a gradient of 0.433 p.s.i./ft., then the required additional density in the 2000 ft. would be 0.87/0.433=2. But there already is a fluid of density=2 present and an additional density of 2 is required, so a fluid of density of 4 is needed to control the well. This is equivalent to a fluid weighing 32 lb. per gal. for the 2000 feet of hole that can be filled such as with the composition of the present invention.

Still another situation wherein the extreme density fluid has substantial utility is a high pressure zone deep in the well bore with an incompetent zone above. In this case, it frequently happens that lost returns into the incompetent zone occur before the mud weight is high enough to contain the high pressure zone. Under such circumstances, it becomes desirable to set casing through the incompetent section. The high density fluid of the present invention is used to control the pressure in the lower zone and still leave the upper incompetent zone exposed to the lighter mud while running casing. The determination of the fluid density is similar to that described above.

The smelter by-product is obtained from certain smeltering operations and has an approximate weight analysis of:

| | |
|---|---|
| Iron | 52.0 |
| Antimony | 3.6 |
| Arsenic | 31.9 |
| Silicon dioxide | 2.4 |
| Sulfur | 3.6 |
| Copper | 2.2 |
| Lead | 1.9 |
| Gangue | 2.4 |
| | 100.0 |

This composition has iron and arsenic in it in a ratio of about 1.5:1. Specifically, the iron and arsenic are in a ratio of about 1.6:1.

The smelter by-product is well known and is described in the Van Dyke U.S. Patent 2,895,911 wherein the smelter by-product is termed "Speiss."

When high pressures are encountered in drilling an oil or gas well, it is necessary to increase the density of the drilling fluid to balance the high pressure. In some cases, densities in the drilling fluid of 4.0 or about 32 pounds per gallon or even higher, may be needed. In some of the common weighting agents employed, for example, barites, the maximum density obtainable in the fluid which may still be pumped is usually about 24 pounds per gallon. Thus, if higher densities are needed, then other material of higher specific gravity than barites must be used. However, if materials of higher specific gravity are used, these weighting agents require the presence of clay materials to maintain the materials in suspension or otherwise the great weight of the weighting material causes them to settle out from the suspension, which is undesirable in drilling fluid.

It has been found unexpectedly that a smelter by-product containing iron and arsenic in a ratio of about 1.5:1 will remain in suspension in clay-free water when used in a certain amount; for example, when the smelter by-product having the composition given supra is added in amounts from about 3 to about 8 parts by weight to water, the suspension may have a weight in the range from about 19 to about 32 pounds per gallon and yet the suspension will not suffer. For example, in slurries of the smelter by-product containing 1 part by weight of the smelter by-product in water, the smelter by-product settles rapidly and forms a hard layer on the bottom of the container. Slurries containing 2 parts of the smelter by-product per part of water form a gel with very little settling while slurries containing 3 or more parts of the smelter by-product per part of water form firm gel structures and no settling is apparent over a period of several days.

It is contemplated in the practice of the present invention that the flow properties of these slurries may be improved by the addition of amounts of ferrochrome lignosulfonate ranging from about 1 to about 8 pounds of ferrochrome lignosulfonate per barrel of water used in the suspension. For example, a 30.7 pound per gallon fluid of usable properties for control of wells has been prepared containing only smelter by-product, water, and ferrochrome lignosulfonate. The composition and flow properties of this fluid are presented below:

| Composition: | Lbs. per barrel of water |
|---|---|
| Selter by-product | 2240 |
| Ferrochrome lignosulfonate | 8.4 |

Then density of this material was 30.7 lbs. per gallon and the plastic viscosity more than 500 centipoises at 75° F. The yield point of the composition was 190 lbs. per 100 square feet. The yield point is obtained by extrapolating to zero a line drawn through a plot of 300, 200, 100 revolutions per minute readings obtained with a Fann VG meter, model 35.

Fluids of higher density and better flow properties than those mentioned before for control of wells may be obtained by using the smelter by-product to suspend galena, which is lead sulfide. The composition and properties of such a fluid are shown below.

| Density | lbs. per gallon | 31.8 |
|---|---|---|
| Plastic viscosity | centipoises at 75° F. | 365 |
| Yield point | lbs. per 100 sq. ft. | 65 |

The composition of this suspension having these properties was 1260 lbs. of the smelter by-product per barrel of water, 1120 pounds of the galena per barrel of water, and 8.4 lbs. of the ferrochrome lignosulfonate per barrel of water.

A satisfactory very high density control fluid may be prepared with no clay by using a smelter by-product which acts as a suspending agent as well as a weighing agent. Thus, the smelter by-product may be used alone or in conjunction with galena and the fluids containing them may be thinned with sufficient quantities of the ferrochrome lignosulfonate.

It is contemplated that the ferrochrome lignosulfonate will be used in amounts of from about 1 to about 8 lbs. ferrochrome lignosulfonate per barrel of the water, with best results being obtained in amounts ranging from about 4 to about 8 lbs. of ferrochrome lignosulfonate per barrel of water. Likewise, the galena may be used with the smelter by-product in an amount sufficient to provide the desired weight. For example, weights from about 27 to about 32 lbs. per gallon for the control fluid may be desired. With weights in the range from about 31 to about 32 lbs. per gallon, the smelter by-product and the galena in substantially equal amounts may be sufficient.

Another slurry was made up which contained 1260 lbs. of iron-arsenic or smelter by-product and 980 lbs. of galena per barrel of water. The slurry, having a density of 31.2 lbs. per gallon, gelled when allowed to stand and thus retained the solids in suspension. The flow behavior of the slurry was measured with the Fann VG meter. Ferrochrome lignosulfonate was then added to the slurry in increments and the flow behavior was measured after each addition. The principal effect of the addition of ferrochrome lignosulfonate was to reduce the yield point of the slurry. After 5.6 lbs. of the ferrochrome lignosulfonate per barrel of water has been added, the yield point was reduced to a low value and the mixture flowed essentially as a Newtonian liquid.

The results of the several operations demonstrated in the present invention show that high density fluids having satisfactory flow properties may be prepared using the smelter by-product alone or with galena as the weighting agent. Fluids with densities as high as 32 lbs. per gallon may be prepared using large amounts of the smelter by-product to suspend galena. Ferrochrome lignosulfonate is an effective thinner for these heavy fluids.

In practicing the present invention, a suspension is made up containing from about 3 to about 8 parts of the smelter by-product per part of water and having a weight in the range from about 19 to about 32 lbs. per gallon and optionally containing about 1 to about 8 lbs. of ferrochrome lignosulfonate and also galena. This suspension is circulated down a hollow drill stem which is used in drilling a well and which is rotated to make hole. When a formation, sand, zone, or stratum is pierced which has a high pressure greater than that of the column of drilling fluid, the suspension of the present invention is circulated down the hollow drill stem and up the annulus between the drill stem and the wall of the well. The aqueous suspension replaces at least a portion of the column of drilling fluid and provides sufficient density to the column to control high pressure formations which may be pierced by the drill string containing a drill bit on its lower end. Accordingly, the present invention is quite important and useful and advantageous in that it may be used to control high pressure formations which are pierced in drilling a well. Not only is the invention important from this viewpoint, but it no longer requires the use of clays in well control or completion fluids. In other words, in the practice of the present invention, a composition consisting of smelter by-product, water, and optionally ferrochrome lignosulfonate and galena may be employed. Unexpectedly, it has been found that the smelter by-product which contains iron and arsenic in a ratio of about 1.5 to 1 and used in excess of from about 3 parts per part of water will form a stable suspension which will not precipitate. Furthermore, such a suspension will hold galena in suspension.

The present invention is quite advantageous, useful, and important in that for the first time high density control or completion fluids are prepared and used which do not require the presence of clay-like materials such as bentonite to suspend the high density materials in the suspension. Thus, in the present invention, the smelter by-product unexpectedly, although of a high density, suspends itself and the galena in the clay-free water.

The nature and objects of the present invention having been completely described and illustrated, what I wish to claim as new and useful and secure by Letters Patent is:

1. A composition for use in wells consisting of a clay-free aqueous suspension containing from about 3 to about 8 parts of Speiss per part of water and having a weight in the range from about 19 to about 32 pounds per gallon, said suspension containing from about 1 to about 8 pounds of ferrochrome lignosulfonate per barrel of said water, said Speiss comprising iron and arsenic in a ratio of about 1.5:1, said suspension forming a firm gel structure.

2. A composition in accordance with claim 1 in which the Speiss has an approximate weight analysis of:

| | |
|---|---:|
| Iron | 52.0 |
| Antimony | 3.6 |
| Arsenic | 31.9 |
| Silicon dioxide | 2.4 |
| Sulfur | 3.6 |
| Copper | 2.2 |
| Lead | 1.9 |
| Gangue | 2.4 |
| | 100.0 |

3. A composition for use in wells consisting of a clay-free aqueous suspension containing from about 3 to about 8 parts of Speiss per part of water and having a weight in the range from about 19 to about 32 pounds per gallon, said suspension containing from about 1 to about 8 pounds of ferrochrome lignosulfonate per barrel of said water and amounts of said Speiss and galena sufficient to provide said weight, said Speiss comprising iron and arsenic in a ratio of about 1.5:1, said suspension forming a firm gel structure.

4. A method for controlling a well containing a column of drilling fluid and drilled to penetrate a formation having a pressure greater than that of said column which comprises forming a clay-free aqueous suspension containing from about 3 to about 8 parts of Speiss per part of water and having a weight in the range from about 19 to about 32 pounds per gallon, said Speiss comprising iron and arsenic in a ratio of about 1.5:1, said suspension containing from about 1 to about 8 pounds of ferrochrome lignosulfonate per barrel of said water, and then circulating said suspension in said well to replace at least a portion of the drilling fluid in said column with said suspension and thereby provide said column with sufficient density to exceed the pressure of said formation.

5. A method in accordance with claim 4 in which the Speiss has an approximate weight analysis of:

| | |
|---|---:|
| Iron | 52.0 |
| Antimony | 3.6 |
| Arsenic | 31.9 |
| Silicon dioxide | 2.4 |
| Sulfur | 3.6 |
| Copper | 2.2 |
| Lead | 1.9 |
| Gangue | 2.4 |
| | 100.0 |

6. A method for controlling a well containing a column of drilling fluid and drilled to penetrate a formation having a pressure greater than that of said column which comprises forming a clay-free aqueous suspension containing from about 3 to about 8 parts of Speiss per part of water and having a weight in the range from about 19 to 32 pounds per gallon, said Speiss comprising iron and arsenic in a ratio of about 1.5:1, said suspension containing from about 1 to about 8 pounds of ferrochrome lignosulfonate per barrel of said water and amounts of said Speiss and galena sufficient to provide said weight, and then circulating said suspension in said well to replace at least a portion of the drilling fluid in said column with said suspension and thereby provide said column with sufficient density to exceed the pressure of said formation.

References Cited in the file of this patent
UNITED STATES PATENTS

| | | |
|---|---|---|
| 2,276,075 | Wuensch | Mar. 10, 1942 |
| 2,393,047 | Krase | Jan. 15, 1946 |
| 2,895,911 | Van Dyke | July 21, 1959 |
| 2,935,504 | King et al. | Mar. 3, 1960 |